(12) United States Patent
Pateromichelakis et al.

(10) Patent No.: US 10,999,783 B2
(45) Date of Patent: May 4, 2021

(54) RADIO RESOURCE MANAGEMENT CONFIGURATION DEVICE AND METHOD

(71) Applicant: HUAWEI TECHNOLOGIES CO., LTD., Guangdong (CN)

(72) Inventors: Emmanouil Pateromichelakis, Munich (DE); Alexandras Kaloxylos, Munich (DE); Chenghui Peng, Munich (DE)

(73) Assignee: HUAWEI TECHNOLOGIES DUESSELDORF GMBH, Munich (DE)

( * ) Notice: Subject to any disclaimer, the term of this patent is extended or adjusted under 35 U.S.C. 154(b) by 0 days.

(21) Appl. No.: 16/366,540

(22) Filed: Mar. 27, 2019

(65) Prior Publication Data

US 2019/0223088 A1   Jul. 18, 2019

Related U.S. Application Data

(63) Continuation of application No. PCT/EP2016/073147, filed on Sep. 28, 2016.

(51) Int. Cl.
*H04W 48/12* (2009.01)
*H04L 12/24* (2006.01)
(Continued)

(52) U.S. Cl.
CPC .......... *H04W 48/12* (2013.01); *H04L 41/044* (2013.01); *H04L 41/0893* (2013.01);
(Continued)

(58) Field of Classification Search
CPC ... H04L 41/044; H04L 41/0893; H04L 43/08; H04W 24/02; H04W 48/12; H04W 76/27
See application file for complete search history.

(56) References Cited

U.S. PATENT DOCUMENTS 7,069,009 B2 * 6/2006 Li .................. H04B 7/022
455/446
8,521,172 B2 * 8/2013 Rosenau ............... H04W 28/16
455/445
(Continued)

FOREIGN PATENT DOCUMENTS

CN   102714863 A   10/2012
CN   104661266 A    5/2015
(Continued)

OTHER PUBLICATIONS

3GPP TR 36.893 V13.1.0 (Jun. 2016),3rd Generation Partnership Project;Technical Specification Group Radio Access Network;Evolved Universal Terrestrial Radio Access (E-UTRA);700MHz band for Arab Region(Release 13),total 26 pages.
(Continued)

*Primary Examiner* — Eric Nowlin
(74) *Attorney, Agent, or Firm* — Womble Bond Dickinson (US) LLP

(57) ABSTRACT

Embodiments of the present disclosure provide a Radio-resource management (RRM) configuration device, and corresponding method, for a network comprising a plurality of access nodes. The device is configured to divide the plurality of access nodes of the network into clusters, and to select at least one access node of each cluster as RRM controller. Further, the device is configured to determine the non-selected access nodes of each cluster as slave nodes, and to select, for each cluster, an RRM split between each slave node and the at least one RRM controller of the respective cluster. The device is also configured to transmit, to each access node, information about its cluster, the at least one RRM controller of the cluster, and the selected RRM split.

16 Claims, 10 Drawing Sheets

(51) Int. Cl.
  *H04W 24/02* (2009.01)
  *H04L 12/26* (2006.01)
  *H04W 76/27* (2018.01)
(52) U.S. Cl.
  CPC ............ *H04L 43/08* (2013.01); *H04W 24/02* (2013.01); *H04W 76/27* (2018.02)

(56) References Cited

U.S. PATENT DOCUMENTS

| | | | |
|---|---|---|---|
| 8,798,021 | B2 | 8/2014 | Mangalvedhe et al. |
| 9,125,047 | B2 | 9/2015 | Sundaresan et al. |
| 9,241,276 | B2* | 1/2016 | Foschini ............... H04W 24/02 |
| 9,288,690 | B2* | 3/2016 | Brueck ............ H04W 36/00835 |
| 9,407,520 | B2* | 8/2016 | Stalnacke ............. H04L 43/065 |
| 9,706,450 | B2* | 7/2017 | Chang ............... H04W 36/0061 |
| 9,706,490 | B2* | 7/2017 | Legg ................... H04L 41/0833 |
| 9,883,467 | B2* | 1/2018 | Uemura ................ H04W 52/34 |
| 9,883,504 | B2* | 1/2018 | Ma ....................... H04L 12/6418 |
| 10,397,050 | B2* | 8/2019 | Maeder ............... H04W 88/085 |
| 10,644,942 | B2* | 5/2020 | Kachhla ................ H04L 41/082 |
| 2004/0127223 | A1* | 7/2004 | Li ........................... H04L 5/006 455/446 |
| 2008/0020801 | A1 | 1/2008 | Fesas et al. |
| 2009/0312027 | A1* | 12/2009 | Foschini ............... H04W 24/02 455/446 |
| 2011/0294527 | A1* | 12/2011 | Brueck ............ H04W 36/00835 455/466 |
| 2012/0014272 | A1* | 1/2012 | Zhou ..................... H04L 5/0035 370/252 |
| 2012/0178483 | A1* | 7/2012 | Rosenau ............... H04W 28/16 455/509 |
| 2013/0155903 | A1* | 6/2013 | Bi ........................ H04L 67/322 370/255 |
| 2013/0210434 | A1 | 8/2013 | Dimou et al. |
| 2013/0303081 | A1* | 11/2013 | Chang ............... H04W 36/0061 455/11.1 |
| 2014/0140295 | A1 | 5/2014 | Manssour |
| 2015/0078168 | A1 | 3/2015 | Lee et al. |
| 2015/0092673 | A1 | 4/2015 | Singh et al. |
| 2015/0111503 | A1* | 4/2015 | Stalnacke ............. H04L 43/065 455/67.11 |
| 2015/0189589 | A1* | 7/2015 | Legg ................. H04W 52/0206 370/311 |
| 2015/0312904 | A1* | 10/2015 | Ma ....................... H04L 12/6418 370/329 |
| 2016/0119087 | A1* | 4/2016 | Rost ..................... H04L 1/1812 370/328 |
| 2016/0119941 | A1 | 4/2016 | Ko et al. |
| 2016/0157145 | A1* | 6/2016 | Brueck ............. H04W 36/0083 370/331 |
| 2016/0262038 | A1 | 9/2016 | Dunn et al. |
| 2017/0078984 | A1* | 3/2017 | Uemura ............. H04W 52/365 |
| 2017/0347337 | A1* | 11/2017 | Uchino .................. H04L 5/001 |
| 2018/0139091 | A1* | 5/2018 | Maeder ................ H04W 16/18 |
| 2018/0175923 | A1* | 6/2018 | Liang .................... H04W 24/10 |
| 2019/0215829 | A1* | 7/2019 | MacKenzie .......... H04W 16/10 |
| 2019/0223024 | A1* | 7/2019 | MacKenzie .......... H04L 5/0035 |
| 2019/0223088 | A1* | 7/2019 | Pateromichelakis ... H04L 43/08 |
| 2019/0245740 | A1* | 8/2019 | Kachhla ................. H04L 41/04 |
| 2019/0253937 | A1* | 8/2019 | Hsieh ................... H04W 88/184 |
| 2019/0335345 | A1* | 10/2019 | Yan ....................... H04W 24/02 |
| 2020/0100137 | A1* | 3/2020 | Panchal ............ H04W 72/0453 |

FOREIGN PATENT DOCUMENTS

| | | | | |
|---|---|---|---|---|
| CN | 105493526 | A | | 4/2016 |
| CN | 109792613 | A | * | 5/2019 ......... H04L 41/0893 |
| EP | 1592275 | A1 | | 11/2005 |
| EP | 2763487 | A1 | | 8/2014 |
| EP | 2456255 | B1 | | 7/2019 |
| EP | 3510805 | A1 | * | 7/2019 ............. H04L 43/08 |
| WO | 2013/123670 | A1 | | 8/2013 |
| WO | 2014018864 | A1 | | 1/2014 |
| WO | 2014196715 | A1 | | 12/2014 |
| WO | 2015/069983 | A1 | | 5/2015 |
| WO | WO-2018059680 | A1 | * | 4/2018 ............ H04W 48/12 |

OTHER PUBLICATIONS

3GPP TR 36.913 V13.0.0 (Dec. 2015),3rd Generation Partnership Project;Technical Specification Group Radio Access Network;Requirements for further advancements for Evolved Universal Terrestrial Radio Access (E-UTRA) (LTE-Advanced)(Release 13),total 15 pages.

3GPP TR 38.913 V0.4.0 (Jun. 2016), "3rd Generation Partnership Project;Technical Specification Group Radio Access Network;Study on Scenarios and Requirements forNext Generation Access Technologies;(Release 14)", total 35 pages.

3GPP TS 36.300: Evolved Universal Terrestrial Radio Access (E-UTRA) and Evolved Universal Terrestrial Radio Access Network (E-UTRAN); Overall description; Stage 2, v. 13.3.0, Apr. 2016,total 295 pages.

5G PPP Architecture Working Group,"5G PPP Architecture Working Group—View on 5G Architecture Version 1.0" Jul. 2016,total 61 pages https://5g-ppp.eu/white-papers/.

D. Sabella et al., "RAN as a service: Challenges of designing a flexible RAN architecture in a cloud-based heterogeneous mobile network," Future Network and Mobile Summit (FutureNetworkSummit), 2013, Lisboa, 2013, pp. 1-8.

Next Generation Mobile Networks (NGMN) Alliance, "5G White Paper", Feb. 2015, pp. 1-125.

T. O. Olwal et al, "A Survey of Resource Management towards 5G Radio Access Networks," in IEEE Communications Surveys and Tutorials , vol. 18, No. 3, Third Quarter 2016, pp. 1656-1686.

Yousaf, Faqir Zarrar, and Tank Taleb. "Fine-grained resource-aware virtual network func-tion management for 5G carrier cloud." IEEE Network 30.2 (2016): 110-115.

\* cited by examiner

RADIO RESOURCE MANAGEMENT CONFIGURATION DEVICE AND METHOD

CROSS-REFERENCE TO RELATED APPLICATIONS

This application is a continuation of International Patent Application No. PCT/EP2016/073147, filed on Sep. 28, 2016, the disclosure of which is hereby incorporated by reference in its entirety.

TECHNICAL FIELD

Embodiments of the present disclosure relate to a Radio Resource Management (RRM) configuration device and an RRM configuration method. In particular, the RRM configuration device and method are for selecting and activating at least one access node to act as an RRM controller for a plurality of other access nodes. Further, the RRM configuration device and method are for determining, in which of the access nodes the RRM, i.e. specific RRM functions, are placed and performed, particularly when operating in a slice-aware network. The RRM configuration device and method are particularly applicable to heterogeneous networks (HetNets), in which multiple 5G services and verticals share the same physical Radio Access Network (RAN) deployment.

BACKGROUND

Explosive growth in capacity and coverage demands emerged the evolution of traditional RANs towards highly densified and heterogeneous deployments, as foreseen in some 5G scenarios.

An exemplary use case is a dense urban scenario, for which macro-cells (or macro Transmit and Receive Points (TRPs), as defined in 3GPP), and a mixture of planned and un-planned micro-cells (or micro TRPs, as defined in 3GPP) are assumed under the macro-cell umbrella. Thereby, both ideal and non-ideal backhaul can be present. In such a scenario centralized solutions are highly required for optimal performance. However, while this may be a feasible solution for Cloud-based radio access network (C-RAN) deployments, it is not for distributed radio access network (D-RAN) deployments.

Other use cases originate from vertical industries (e.g. automotive, e-health, smart grid etc.), which are considered important drivers for 5G requirements. In particular, 5G networks should be able to adapt to the needs of such vertical industries, for instance, in terms of latency, reliability, security or quality of service (QoS). To this end, the introduction of network slices, which are logical end-to-end sub-networks corresponding to, for instance, different verticals, is envisioned as important 5G feature. However, network slices will significantly impact on the RAN design. In particular, the RRM is one of the main aspects to be affected by network slices. This is due to the fact that different network slices aim at different goals e.g. throughput, or latency or reliability, which goals affect how RRM functions work, and where these RRM functions are best placed.

RRM functions are also affected by RAN limitations. For example, in a dense heterogeneous RAN, multiple limitations for backhaul/access may require certain handling of the RRM. In particular, a non-ideal wireless backhaul between RAN nodes as a limiting factor may require extra RRM for the backhaul part. Therefore, joint backhaul/access optimization should preferably be used, in order to meet high throughput requirements for throughput demanding services.

Another limiting factor is excessive signaling, which is usually required in a dense urban heterogeneous scenario for wireless backhaul and access measurements. This limiting factor becomes even more pronounced when new RRM functional interactions are added, for instance by performing fast scheduling decisions in micro-cells (as e.g. in Ultra Reliable and Low Latency Communications (URLLC)). In this case, information exchange between RRM functions will need to be done among RAN nodes in the X2 interface, so as to ensure that target Key Performance Indicators (KPIs) are met.

Given the various RAN limitations, the RRM may be grouped into three main groups, with respect to output, in-between interactions, and operating time scale, namely:
1. Slow RRM, which can trigger cell selection/re-selection.
2. Fast RRM, which can change resource utilization/restrictions.
3. Basic RRM for bearer admission and control.

Further, a fourth group may be introduced for D-RAN cases, the fourth group being concerned with wireless backhaul RRM and wireless topology handling.

Moreover, with respect to a level of centralization of the RRM, three different RRM types are observed, namely:
1. Centralized RRM: In centralized solutions, RRM functions for multiple access nodes in a group operate together in one entity (e.g. in one access node). In embodiments of the present disclosure, such centralized RRM is denoted as 'RRM Split A'. 'RRM split A' provide fast and simple interactions between RRM functions. However, e.g. in HetNets, an ideal backhaul for some fast RRM functions (e.g. coordinated multi-point (CoMP), DRA) is required. Moreover, signaling overhead may become high in ultra-dense environments. Prior to 4G systems, centralized RRM was performed by using a Radio Network Controller (RNC). The main RRM functions are in this case about Handover, Power Control, Admission Control, Packet Scheduling and Code Management. Then, in 4G systems, RRM became much simpler with less granular scheduling decisions.

Furthermore, for 5G systems, solutions have been proposed that require controllers for clusters of HetNets (e.g. Cloud-based Resource pooling and management (C-RAN)). Therein, resource pooling and a centralized management of resources may provide high gain in terms of capacity. Nevertheless, this requires ideal backhaul/fronthaul, and can be seen as challenging task for dynamic resource allocation in fast changing environments. This is particularly true, when assuming also interference from other C-RAN clusters.

2. Distributed RRM: In 3GPP LTE/LTE-A (see '3GPP TS 36.300: Evolved Universal Terrestrial Radio Access (E-UTRA) and Evolved Universal Terrestrial Radio Access Network (E-UTRAN); Overall description; Stage 2, v. 13.3.0, April 2016'), more sophisticated RRM functions are defined, which reside as a whole at the eNodeB. In the present disclosure, distributed RRM is denoted as 'RRM Split C'. The main RRM functions are in this case about Dynamic Resource Allocation (DRA), Interference Coordination (ICIC) and Connection Mobility Control (CMC), Radio Bearer Admission and Control (RAC, RBC), Energy Efficiency and Load Balancing (LB). In the RRM of LTE, there can be interactions between RRM functions. An example is the Cell on/off function, which may require input from the resource restrictions due to Interference Management (IM), and its output will require handovers, which will affect mainly CMC and LB. Since, all these RRM functions reside at the eNodeB, there is no additional signaling specified in 3GPP for the RRM interactions.

3. Semi-Centralized RRM: Some studies discussed two levels of RRM, e.g. denoted as Global and Local Scheduling. These studies mainly focused on centralized IM and LB, and distributed fast RRM functionalities. In the present disclosure, semi-centralized RRM is denoted as 'RRM Split B'.

In slice-aware RANs, different RRM functionalities and placements are required, in order to ensure that service-tailored KPIs are met. Tight KPI requirements in 5G systems (esp. for URLLC and connected cars) rely on fast and sophisticated RRM. Furthermore, different RRM procedures may be required for diverse network slices, and in different time scales. Network slice requirements are shaped by the target KPIs and key RAN characteristics, e.g. user mobility and user/cell densities. User mobility may affect backhaul resource allocation, handover, and IM. User density may affect delays, signaling required, IM, and resource availability.

For different network slices, these effects require different actions from an access node point of view, in order to meet the end-to-end KPIs. In other words, different resource management and control placement of the RRM functions is required from slice to slice. As an example, on the one hand, for the v2x Slice a distributed RRM is preferred (most RRM locally). Therefore, the threshold to centralized RRM will be high (e.g. for Centralized Mobility Control). For enhanced mobile broadband (eMBB), on the other hand, high centralization of RRM is needed.

Network slices allow for flexible functional placements and tailored network functions to meet per slice SLAs. Hence, slice-specific RRM and isolation among slices, utilizing the same RAN, is an open topic. In this context, inter-slice RRM may be defined as another functional block, which dictates the RAN sharing and level of isolation/prioritization among network slices. However, the impact of slicing on RRM functions, which can trigger their adaptive placement in RAN nodes in a semi-distributed manner, is not yet discussed.

In summary, the handling of multiple and different resources in a dense urban 5G RAN, particularly with different slice KPIs, requires an RRM controller for orchestrating the RRM and control, particularly between network slices. Centralized solutions may be required to meet required performance goals.

However, selecting an RRM controller is challenging, since the physical placement and dimensioning of an RRM controller plays an important role for the efficiency of the RRM. A high number of RRM controllers will further provide more granular RRM, however this may impose high delays for the communication between RRM Controllers, due to the functional dependencies in case that these RRM controllers reside in different entities. On the other hand, one flat RRM Controller for a RAN will not allow for an efficient slice-tailored RRM, since the centralization impact would be different from to slice to slice. Also, backhaul capabilities provide limitations regarding the placement of RRM controllers. Therefore, RRM controllers need to be close to the access nodes, because factors like C-Plane latency are critical for dynamic resource allocation or the RRM efficiency will be low.

WO 2014/018864 A1 proposes a solution that requires a centralized controller for clusters of HetNets in C-RAN deployment.

U.S. Pat. No. 8,798,021 B2 provides a hierarchical network and interference management framework. In that work, C-SON is proposed as a network management server, which gives coordination instructions to clusters of heterogeneous APs. These instructions can be pre-determined parameters for load balancing or interference management between clusters. A cluster includes a macro and also picos and RRHs, and the controllers mainly decide coordinated multi-point (CoMP)/enhanced inter-cell interference coordination (eICIC) policies.

SUMMARY

In view of the above-mentioned challenges in the prior art, the embodiments of the present disclosure aim to improve the state of the art. In particular, an object of embodiments of the present disclosure is to provide an RRM configuration device and RRM configuration method for selecting and activating access nodes to act as RRM controllers for a number of other access nodes. The RRM configuration device and RRM configuration method can also select the placement of specific RRM functions in access nodes, particularly when these are operating in a slice-aware network.

An object of embodiments of the present disclosure is achieved by the solution provided in the enclosed independent claims. Advantageous implementations of embodiments of the present disclosure are further defined in the dependent claims.

In particular, the present disclosure describes the creation of clusters from a pool of access nodes, e.g. from base stations (BSs) or access points (APs), which are also denoted in the present disclosure as Transmit-Receive-Points (TRPs). The present disclosure also describes the selection and configuration of one or more access nodes as controller(s), which are denoted in the present disclosure as RRM controllers. Further, the present disclosure describes the controlling of the rest of the access nodes of a cluster as controlled entities, which are denoted in the present disclosure as slave nodes or slave-TRPs. The present disclosure also describes how to decide, which RRM functions are to be decided/performed at an RRM controller, and which functions are distributed among the other access nodes of a cluster. Subsequently, the present disclosure also describes dynamic adaptation of an RRM controller from a cluster of access nodes.

In some embodiments of the present disclosure an initial configuration includes the RRM controller selection and cluster formation, along with an RRM split decision (which denotes a level of centralization of the RRM functions). Optionally, this is followed by intra-cluster inter-node communication, and inter-node communication after configuring the controlling units and their responsibilities. Further, embodiments of the present may comprise a dynamic update of the RRM controller and the RRM split, in order to cope, for instance, with fast traffic load and backhaul changes.

A first aspect of embodiment of the present disclosure provide an RRM configuration device, for a network comprising a plurality of access nodes, which is configured to divide the plurality of access nodes of the network into clusters, select at least one access node of each cluster as RRM controller, and determine the non-selected access nodes of each cluster as slave nodes, select, for each cluster, an RRM split between each slave node and the at least one RRM controller of the respective cluster, and transmit, to each access node, information about its cluster, the at least one RRM controller of the cluster, and the selected RRM split.

An RRM controller is defined as a logical entity, which abstracts a set of access network functionalities and coordinates a group of access nodes as the slave nodes, in order to facilitate RRM and radio resource control. A benefit of this selection of the RRM controller by the RRM configuration device is that the RRM can, for instance, be optimized per KPI of a network slice, e.g. for throughput (using sophisticated interference management), mobility and/or reliability.

The RRM configuration device is able to place RRM controller(s) in different access nodes taking into account, for example, their processing capabilities, the easy reach to the other access nodes, load conditions and network slice requirements. Thus, slice-awareness in RAN has only minimum impact on RAN design.

Other benefits provided are cost efficiency, since a pre-dedicated controlling entity per cluster is not required, the possibility to adapt to a dynamically changing RAN environment, and lower C-Plane delays, since the distribution of RRM functionalities through the RRM split allows control information to be locally exchanged.

The actions of the RRM configuration device may be triggered and executed during network slice creation, and could be further adapted during dynamic network management functions, like switching on and off of BSs.

In a first implementation form of the device according to the first aspect, the RRM configuration device is configured to select the RRM split based on a type of at least one network slice associated with the cluster, preferably based on Quality of Service (QoS), requirements and/or Key Performance Indicators (KPIs), of the at least one network slice.

If non-ideal backhaul exists, the RRM split is preferably chosen as centralized as possible, except if a user mobility is very low and there is no overlapping between (small) micro cells.

Further benefits include slice-awareness in RAN with minimum impact on RAN design, and the possibility of local handling of RRM among network slices, specifically when different slices require additional resources in a fast changing environment (e.g. for Critical Communications).

In a second implementation form of the device according to the first aspect as such or according to the first implementation form of the first aspect, the RRM configuration device is configured to select, for each cluster, the RRM split between a slave node and the at least one RRM controller of the respective cluster based on a backhaul quality of the slave node to the at least one RRM controller and based on an average load of the access nodes of the respective cluster.

Thus, a solution for placing RRM functions in different access nodes taking into account the backhaul conditions is provided. This provides the benefit of most sophisticated RRM when required (e.g. for eMBB) given the RAN backhaul/access resource situation.

In a third implementation form of the device according to the second implementation form of the first aspect, the RRM configuration device is further configured to select the RRM split: as centralized RRM to be performed completely at the at least one RRM controller, if the backhaul quality is ideal and if the average load is below a threshold value; as distributed RRM to be performed distributed among the access nodes of the cluster, if the backhaul quality is ideal and if the average load is above the threshold value; as semi-centralized RRM, wherein a first type RRM is performed distributed among the access nodes of the cluster and a second type RRM is performed at the at least one RRM controller, if the backhaul quality is not ideal.

Accordingly, the RRM split can be selected depending on the backhaul conditions and the load, which significantly increases flexibility and performance.

In a fourth implementation form of the device according to the first aspect as such or according to any of the previous implementation forms of the first aspect, the RRM configuration device is configured to select the at least one access node of each cluster as RRM controller based on at least one of: processing capabilities of the access nodes of the cluster; an average load of the access nodes of the cluster; numbers of neighboring access nodes with ideal backhaul quality for each access node of the cluster; Service Level Agreement (SLA) requirements or KPIs of at least one network slice associated with the cluster.

Thus, placing the RRM controller in different access nodes taking into account important network characteristics is possible. For instance, the use of centralized RRM is thus enabled, even if there is no physical central node acting as controller. Efficiency and performance are significantly increased.

In a fifth implementation form of the device according to the first aspect as such or according to any of the previous implementation forms of the first aspect, the RRM configuration device is configured to determine a priority among the selected RRM controllers based on types of network slices associates with the clusters, wherein the transmitted information includes the determined RRM controller priorities.

Including such priority allows focusing the resource allocation where it is needed most. Higher priority RRM controllers may request lower priority RRM controllers to sacrifice resources in their favor.

In a sixth implementation form of the device according to the first aspect as such or according to any of the previous implementation forms of the first aspect, the RRM configuration device is configured to divide the plurality of access nodes of the network into the clusters and select the RRM controllers by using a graph-based algorithm, wherein the graph includes the access nodes, and wherein edges between access nodes denote a suitability of coordination between these access nodes.

The problem of an appropriate cluster division and controller selection can thus be solved most efficiently, and consequently increases the overall performance.

In a seventh implementation form of the device according to the first aspect as such or according to any of the previous implementation forms of the first aspect, the RRM configuration device is configured to start dividing the plurality of access nodes of the network into the clusters, upon receiving a trigger event, preferably a slice instantiation request.

In an eighth implementation form of the device according to the first aspect as such or according to any of the previous implementation forms of the first aspect, the RRM configuration device is configured to select a cluster size based on at least one of: a number of network slices associated with the clusters; KPIs of the network slices; a number of users per network slice; and load conditions and backhaul conditions per network slice.

In a ninth implementation form of the device according to the first aspect as such or according to any of the previous implementation forms of the first aspect, the transmitted information includes at least a cluster ID, at least one RRM controller ID, and an indication about the RRM split.

A second aspect of embodiments of the present disclosure provide a system comprising an RRM configuration device according to the first aspect as such or according to any of the implementation forms of the first aspect, and the plurality of access nodes, wherein an access node selected by the RRM configuration device as RRM controller of a cluster is configured to dynamically adapt the RRM split between a slave node and the at least one RRM controller in the cluster.

Advantageously, the dynamic adaption of the RRM split may be initiated from the RRM controller, without needing the RRM configuration device. Therefore, the RRM split can be most efficiently adapted, for instance, to current network requirements.

In a first implementation form of the system according to the second aspect, a slave node of a cluster is configured to send to the at least one RRM controller of the cluster an RRM split adaption request message, in order to initiate the dynamic adaption of the RRM split, when triggered by at least one of: a change of backhaul conditions between the slave node and the at least one RRM controller; a user density that is higher than a threshold value; an average user mobility information that is higher than a threshold value; a change of a prioritization of network slices associated with the cluster.

In a second implementation form of the system according to the second aspect as such or according to the first implementation form of the second aspect, an access node selected by the RRM configuration device as an RRM controller of a cluster is further configured to determine a slave node of the cluster to become a new RRM controller, transmit a notification about the new RRM controller to the RRM configuration device.

Advantageously, the determination of a new RRM controller may be initiated from the slave nodes (or the RRM controllers), without requiring the RRM configuration device. Therefore, the controller selection can be most efficiently adapted, for instance, to current network requirements.

In a third implementation form of the system according to the second aspect as such or according to any of the previous implementation forms of the second aspect, an access node selected by the RRM configuration device as an RRM controller of a cluster is further configured to transmit to another access node selected by the RRM configuration device as RRM controller a radio resource change request to re-negotiate the utilization of radio resources.

Thereby, radio resource allocation may be optimized and efficiently adapted, for instance, to current network requirements.

A third aspect of embodiments of the present disclosure provide an RRM configuration method comprising the operations of dividing a plurality of access nodes of a network into clusters, selecting at least one access node of each cluster as RRM controller, and determining the non-selected access nodes of each cluster as slave nodes, selecting, for each cluster, an RRM split between each slave node and the at least one RRM controller of the respective cluster, and transmitting, to each access node, information about its cluster, the at least one RRM controller of the cluster, and the selected RRM split.

In a first implementation form of the method according to the third aspect, the RRM configuration method further comprises dynamically adapting the RRM split between a slave node and the at least one RRM controller of a cluster, and/or determining a slave node of a cluster to become a new RRM controller.

In a second implementation form of the method according to the third aspect as such or according to the first implementation form of the third aspect, the RRM configuration method further comprises selecting the RRM split based on a type of at least one network slice associated with the cluster, preferably based on Quality of Service, QoS, requirements and/or Key Performance Indicators, KPIs, of the at least one network slice.

In a third implementation form of the method according to the third aspect as such or according to the second implementation form of the third aspect, the RRM configuration method further comprises selecting, for each cluster, the RRM split between a slave node and the at least one RRM controller of the respective cluster based on a backhaul quality of the slave node to the at least one RRM controller and based on an average load of the access nodes of the respective cluster.

In a fourth implementation form of the method according to the third implementation form of the third aspect, the RRM configuration method further comprises selecting the RRM split: as centralized RRM to be performed completely at the at least one RRM controller, if the backhaul quality is ideal and if the average load is below a threshold value; as distributed RRM to be performed distributed among the access nodes of the cluster, if the backhaul quality is ideal and if the average load is above the threshold value; as semi-centralized RRM, wherein a first type RRM is performed distributed among the access nodes of the cluster and a second type RRM is performed at the at least one RRM controller, if the backhaul quality is not ideal.

In a fifth implementation form of the method according to the third aspect as such or according to any of the previous implementation forms of the third aspect, the RRM configuration method comprises selecting the at least one access node of each cluster as RRM controller based on at least one of: processing capabilities of the access nodes of the cluster; an average load of the access nodes of the cluster; numbers of neighboring access nodes with ideal backhaul quality for each access node of the cluster; Service Level Agreement (SLA) requirements or KPIs of at least one network slice associated with the cluster.

In a sixth implementation form of the method according to the third aspect as such or according to any of the previous implementation forms of the third aspect, the RRM configuration method comprises determining a priority among the selected RRM controllers based on types of network slices associates with the clusters, wherein the transmitted information includes the determined RRM controller priorities.

In a seventh implementation form of the method according to the third aspect as such or according to any of the previous implementation forms of the third aspect, the RRM configuration method comprises dividing the plurality of access nodes of the network into the clusters and selecting the RRM controllers by using a graph-based algorithm, wherein the graph includes the access nodes, and wherein edges between access nodes denote a suitability of coordination between these access nodes.

In an eighth implementation form of the method according to the third aspect as such or according to any of the previous implementation forms of the third aspect, the RRM configuration method comprises starting dividing the plurality of access nodes of the network into the clusters, upon receiving a trigger event, preferably a slice instantiation request.

In a ninth implementation form of the method according to the third aspect as such or according to any of the previous implementation forms of the third aspect, the RRM configuration method comprises selecting a cluster size based on at least one of: a number of network slices associated with the clusters; KPIs of the network slices; a number of users per network slice; and load conditions and backhaul conditions per network slice.

In a tenth implementation form of the method according to the third aspect as such or according to any of the previous implementation forms of the third aspect, the transmitted information includes at least a cluster ID, at least one RRM controller ID, and an indication about the RRM split.

The third aspect and its implementation forms achieve the benefits and advantages described for the first and second aspects and their respective implementation forms.

It has to be noted that all devices, elements, units and means described in the present application could be implemented in the software or hardware elements or any kind of combination thereof. All operations which are performed by the various entities described in the present application as well as the functionalities described to be performed by the various entities are intended to mean that the respective entity is adapted to or configured to perform the respective operations and functionalities. Even if, in the following description of specific embodiments, a specific functionality or operation to be full formed by external entities is not reflected in the description of a specific detailed element of that entity which performs that specific operation or functionality, it should be clear for a skilled person that these methods and functionalities can be implemented in respective software or hardware elements, or any kind of combination thereof.

BRIEF DESCRIPTION OF THE DRAWINGS

The above described aspects and embodiments of the present disclosure will be explained in the following description of specific embodiments in relation to the enclosed drawings, in which.

DETAILED DESCRIPTION OF THE EMBODIMENTS

Figure 1:
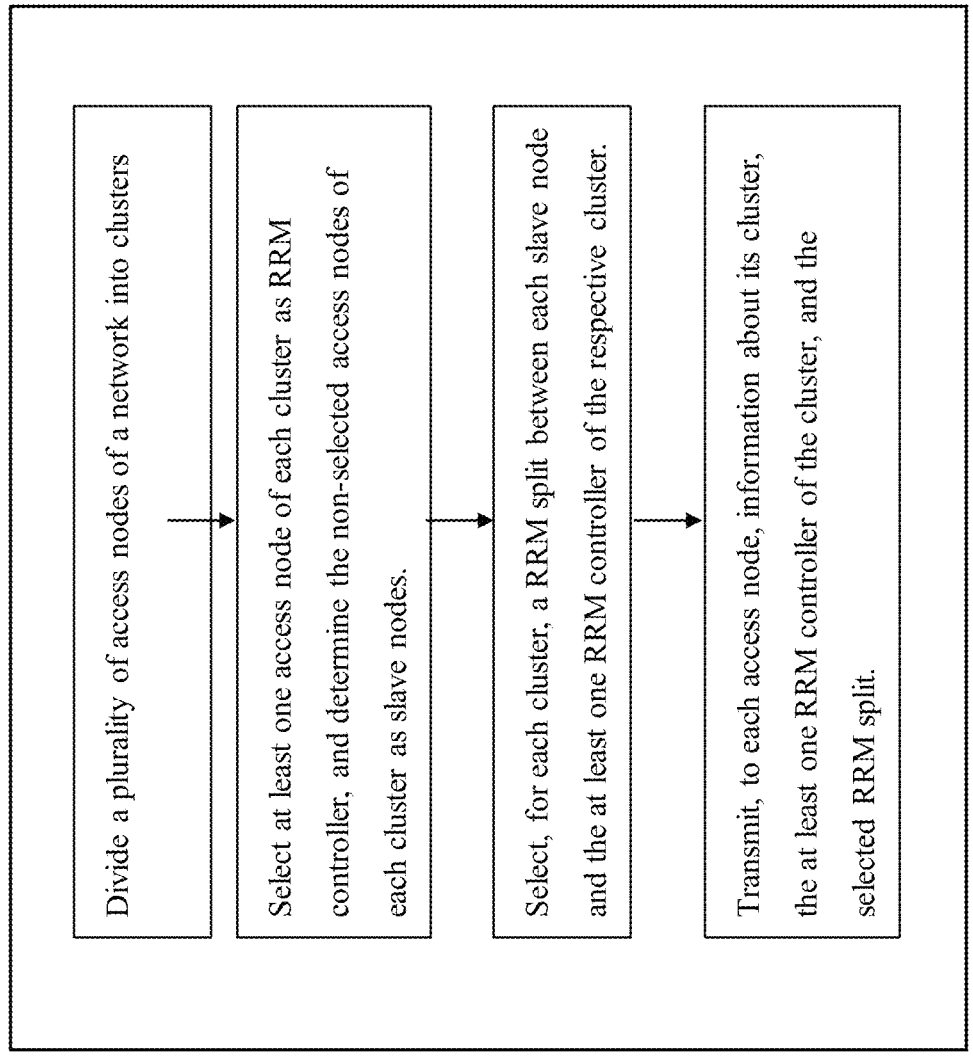
FIG. 1 shows an RRM device according to an embodiment of the present invention.

The present disclosure describes a device and method that decide on how to form clusters of access node (e.g. based on physical deployment, long term statistics of the load of eNBs, and slice characteristics or KPIs), on what is the role of the different access nodes in each cluster (e.g. RRM controller or slave node), and on who is forming the clusters. In particular, the formation of appropriate clusters may be selected, for example, at the network side in an Operations Support Systems (OSS) or in a Network Management System (NMS), generally in an RRM configuration device.

A level of centralization of the actual RRM is decided for each access node, preferably taking into account RAN limitations and the level of slice awareness of the network. The level of centralization is translated as a flexible split of RRM functions (RRM split), which may be slice-tailored and cell-specific. The heterogeneous split of RRM functions provides new requirements for signaling between access nodes. For example, by centralizing only slower RRM functions like IM and LB, signaling may be exchanged for the resource restrictions. and cell re-selections between the centralized and distributed nodes for the dynamic resource allocation. In case of having distributed allocation of IM and LB, e.g. due to slice requirements for fast IM, new messages regarding the dynamic resource restrictions may be exchanged, in order to allow for centralized LB (taking into account and the other RRM splits).

The proposed device and method may specifically operate in three phases. A first phase includes an initial configuration, which includes the RRM controller(s) selection, the cluster selection, and the RRM functional placement at the RRM controller and other access nodes. In particular, an appropriate RRM Controller is selected, as well as an initial RRM split for the different access nodes. In the first phase, also a communication between the RRM controller and the slave nodes may take place, in order to indicate measurements required, and conflicts to be resolved between nodes.

A second phase includes inter-node communication between RRM controllers and other access nodes in normal mode. Here, the level of orthogonalization of resources among different RRM controllers may vary (shared, or partially orthogonal or completely orthogonal). Hence, multiple RRM controllers may exchange signaling and data to optimize RAN performance, for example, by requesting additional resources or by jointly manage shared resources.

A third phase includes mechanisms and signaling required for the dynamic adaptation of the RRM controller selection, the cluster formation, and the RRM split selection. The adaption may be implemented at the RRM controller side, and may be subject to dynamic traffic load, backhaul changes and network slice initiations.

Communication between RRM controllers is important in all phases, in order to ensure smooth resolution of potential resource conflicts in case that the same resources are shared by other network slices or clusters. Two cases of inter-controller communication are envisaged. Firstly, in case of having multiple RRM controllers per cluster, intra-cluster communication is proposed to indicate new resource requests (in the second phase), and update the priorities between RRM controllers belonging to the same cluster (for example, for a case of dynamic changes on backhaul conditions and topology, slice prioritization, and resource situation). Moreover, inter-cluster communication is proposed, for example, for exchanging signaling between different clusters (e.g. when sharing the same resources), since real-time coordination may be required at the cluster edges for the potential resource conflict resolution and negotiation of additional resource if required.

In the following, details of implementing the present invention are described, in particular with respect to the selection of an access node to become RRM controller, and a flexible centralization of RRM functionalities, for instance, in ultra-dense slice aware networks. The present invention optimizes RRM particularly for different KPI-driven network slices, wherein the RRM functionalities and their placement have different impact on their performance.

FIG. 1 shows an RRM configuration device 100 according to an embodiment of the present invention. The RRM configuration device 100 is applicable for a network having a plurality of access nodes. The RRM configuration device is configured to carry out at least the initial configuration phase described above. In particular, it is configured to divide the plurality of access nodes of the network into clusters. An access node or RTP may be a BS, AP or the like. A cluster includes at least two access nodes.

The RRM configuration device 100 is further configured to select at least one access node of each cluster as RRM controller, and determine the non-selected access nodes of each cluster as slave nodes. Further, it is configured to select, for each cluster, an RRM split between each slave node and the at least one RRM controller of the respective cluster. That is, the RRM configuration device 100 selects how RRM functions are distributed between the RRM controller and the slave nodes.

After completing these configuration operations, the RRM configuration device 100 is configured to transmit, to each access node, information about its cluster (for instance a cluster ID), the at least one RRM controller (for instance an ID of the respective access node) of the cluster, and the selected RRM split (e.. distributed or centralized RRM). The information may be transmitted via at least one signaling message.

Details and extensions to the embodiment shown in FIG. 1 are described now with respect to the FIGS. 2-8.

Figure 2:
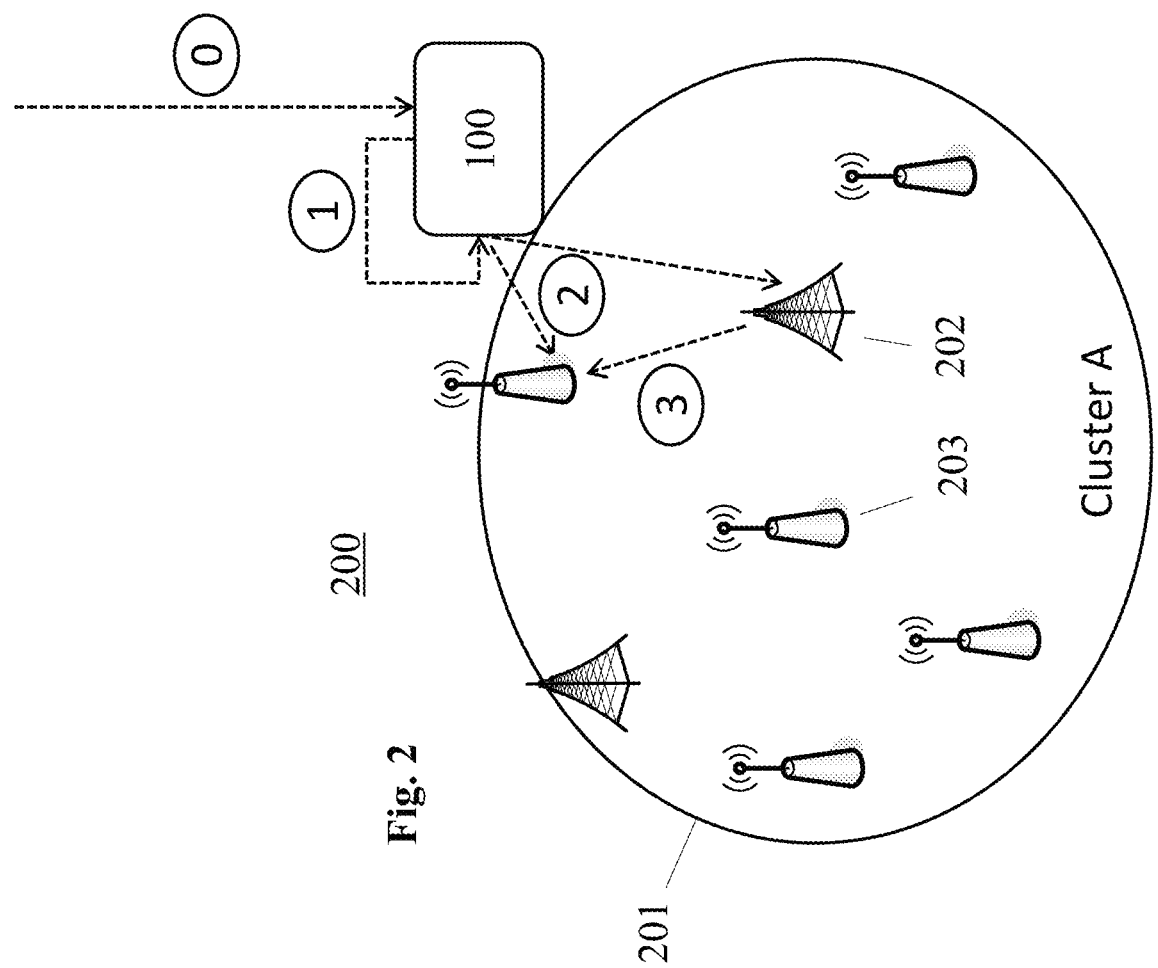
FIG. 2 shows schematically operations of an initial configuration process of a cluster.

As shown in FIG. 2, the RRM configuration device 100, which may be a network management entity like an OSS or NMS, may select at least one RRM controller 202 and the size of a cluster 201, preferably based on the characteristics of the physical access nodes (e.g. BSs), (non)-ideal backhaul links, and the available spectrum). In case of slice support of a network 200, which the RRM configuration device 100 is applied to, the KPIs of every network slice are taken into account, and preferably also long-term statistics for load and backhaul conditions per deployed network slice.

The RRM configuration device 100 then decides on an initial RRM split between slave node 203 of a cluster 201 and the at least one RRM controller 202. The RRM configuration device 100 configures each access node (in the following referred to as TRP) as on its cluster membership, its operation mode as an RRM controller 202 or slave node 203, and according to which initial RRM split will be used between a slave node 203 and the RRM controller 202. The following actions are specifically illustrated in an exemplary cluster 201 deployment in FIG. 2.

Action (0): A trigger event is received by the RRM configuration device 100 for performing the initial configuration e.g., a slice instantiation request.

Action (1): The RRM configuration device 100 takes a decision on how to form the clusters (e.g. based on physical deployment, long-term statistics of the load of access nodes, e.g. eNBs, in the network 200), and which initial RRM split is to be used between slave nodes 203 and RRM controllers 202.

Action (2): A configuration command is sent from the RRM configuration device 100 to cluster members 203 and cluster RRM controller(s) 202.

Action (3): An RRM controller 202 establishes a secured operational communication mode with slave nodes 203.

The selection method for action (1) specifically divides the total set of TRPs into orthogonal clusters 201. Thereafter, one or more TRPs may be selected as RRM controller candidates, for example, based on the following parameters: TRP General Processing capabilities, average load information, number of neighboring TRPs with good or ideal backhaul, network slice KPIs. Then, for instance, based on network slice requirements, different RRM controller candidates can be mapped to different network slices.

The clustering and RRM controller 202 selection of action (1) may be performed as a modified "Maximum Clique" problem, and can be solved using optimal/heuristic graph-based algorithms. The Maximal Clique problem is to find complete sub-graphs within a graph of nodes. In the present problem, the graph consists of TRPs and the edges between the TRPs denote the suitability of coordination between two TRPs (e.g. due to ideal backhaul, short distance). Here, a set of feasible solutions is found (e.g. multiple maximal cliques). From the set of maximal cliques, the aim is to find TRPs with the highest occurrences to become candidates for RRM controllers 202.

For the actions 2 and 3, at the typical operation, signaling is sent from each TRP to the RRM configuration device 100, e.g. NMS. This may include long-term statistics for load and energy consumption per TRP.

Figure 3:
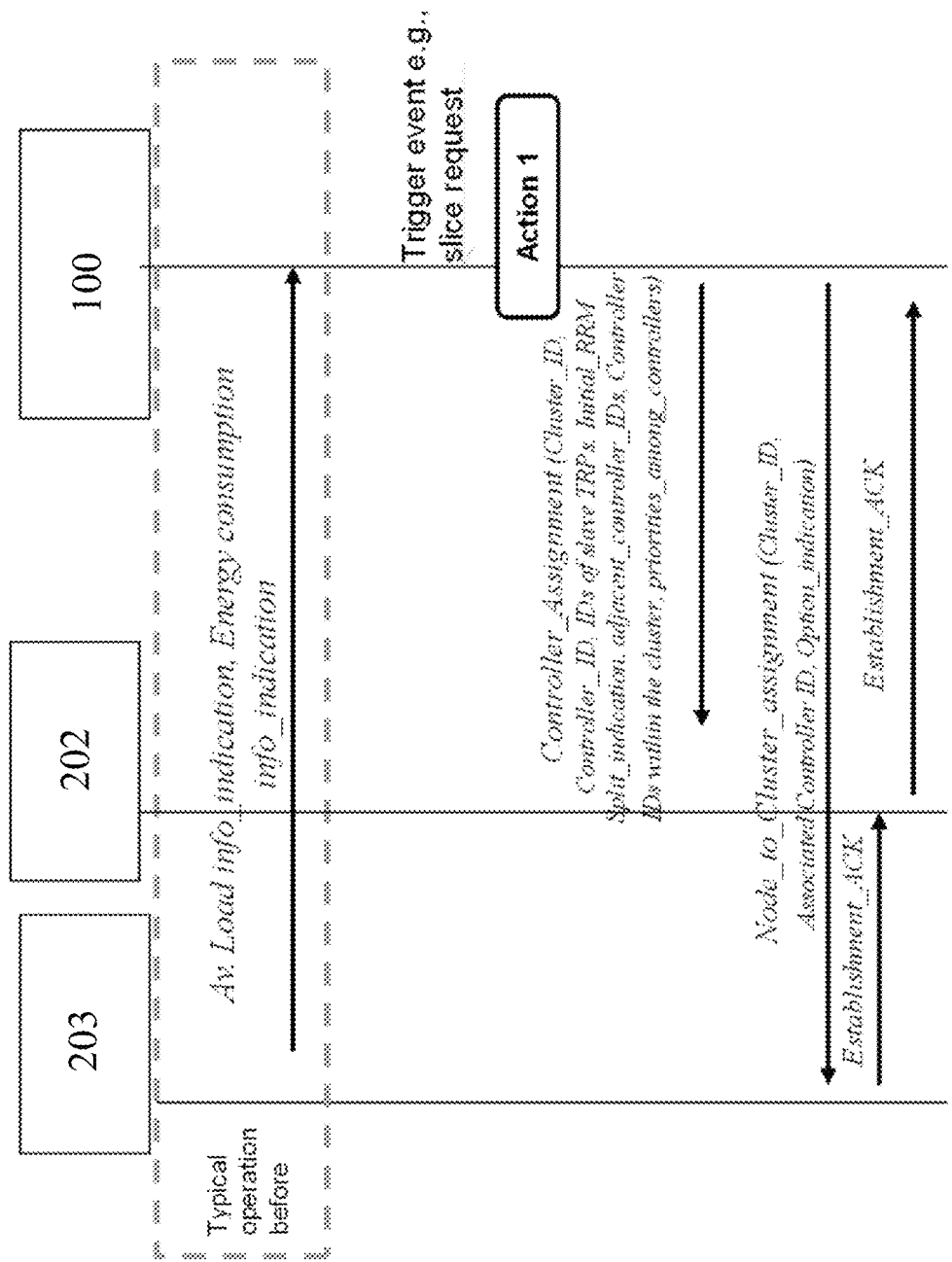
FIG. 3 shows a message sequence for an initial configuration process of a cluster.

Additionally, as can be seen in FIG. 3, new signaling messages may be sent from the RRM configuration device 100 (here NMS) to each TRP, either slave node 203 or RRM controller 202. For RRM controllers 202, the new message is denoted as Controller Assignment (NMS to RRM controller), and may include:

Cluster ID
Set of slave TRP IDs associated with this RRM controller 202
Initial RRM split indication
Controller IDs within the cluster 201
Adjacent-cluster RRM controller IDs
Priorities among RRM controllers 202

The IDs of adjacent RRM controllers 202 are needed for both intra and inter-cluster, and the priority among RRM controllers 202 is required for inter-controller communication. Upon the reception of this message, the RRM controller 202 stores the information to communicate with the other RRM controllers 202 in case of signaling exchange required. This will be the case for resource conflicts (high interfered users), which may occur when utilizing the same resources. Another case would be the signaling and date required to be transferred for interference and mobility management in case of inter-cluster communication (e.g. users at the edges of the cluster, high mobile user approaching the edges). The priorities among RRM controllers 202 will be used in case of negotiating the same resources or applying resource restrictions, in order to identify which slice has higher priority to access the requested resource.

For other TRPs in the cluster 201, i.e. slave nodes 203 (or slave-TRPs), the message Node-to-Cluster Assignment (NMS to Slave-TRPs) may include:

Cluster ID
Associated RRM controller ID
RRM split option indication

The slave-TRP 203 uses the associated RRM controller ID to establish a connection with this RRM controller 202. Therefore, an ACK may be sent from the slave-TRP 203 to the RRM controller 202, in order to acknowledge the establishment of the connection to the other TRP as its RRM controller 202 (so as to ensure that it is aware of the RRM split indication), and is followed by an ACK from the RRM controller 202 to the RRM configuration device 100 (NMS). Alternatively, the ACK can be sent directly to the NMS 100 upon the Node to Cluster Assignment message or from the RRM controller 202 to the NMS 100 after the Controller Assignment Message.

For unplanned TRP deployments, at the process of communication establishment between RRM controller 202 and slave-TRP 203, authentication could be added to ensure secured communication. This could be special to a case of wireless backhaul communication.

Figure 4:
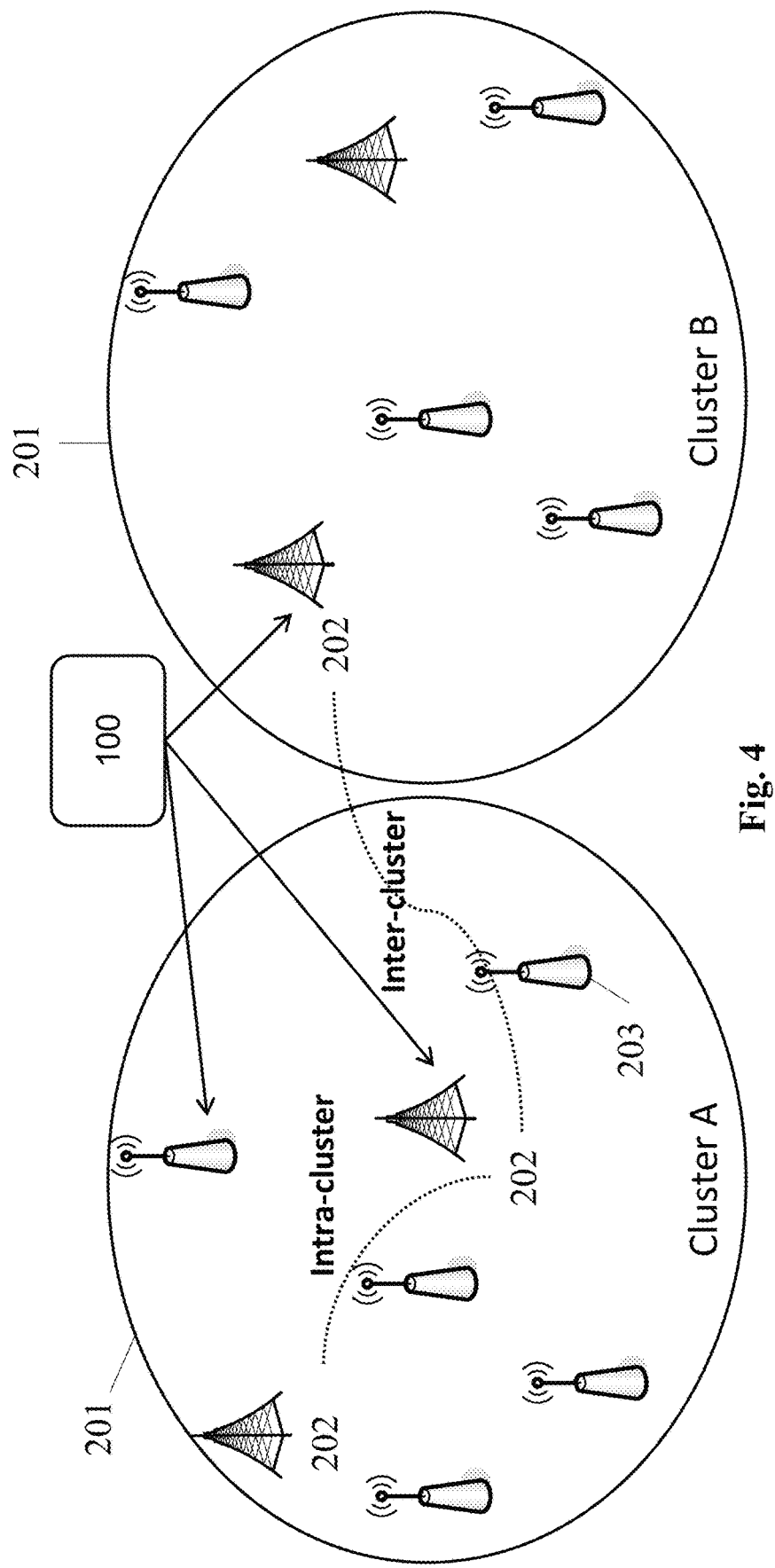
FIG. 4 shows intra- and inter-cluster communications.

For inter-node communication, two types of inter-controller signaling exchange can be defined, as can be seen in FIG. 4:

Inter-cluster: At the cluster edges this communication is required, in order to perform inter-cluster Interference and Mobility management on behalf of edge slave-TRPs 203. It is high likely that the formed clusters 201, as defined in the previous phase, will re-use the same spectrum. Therefore, local coordination may be required for the cluster edges areas. Moreover, in some cases the inter-cluster handover may be required to be performed at first locally, in order to avoid handover failures in case of a centralized mobility control.

Intra-cluster: Multiple RRM controllers 202 may co-exist in the same cluster 201, particularly since different network slices may necessitate different TRPs to have this controller role. For example, a v2x slice might require a macro-TRP to be the RRM controller 202 for a wide area, while for eMBB for a hotspot area (e.g. networked small cells in stadium), a small cell may be assigned as RRM controller 202 of the other small cells. It is likely that there will be a level of orthogonalization of resources between different network slices, as is decided in inter-slice RRM functionality. However, some resources may need to be shared and re-negotiated given traffic changes. Moreover, some TRPs may accommodate multiple slices, and may have different RRM controllers 202. Therefore, communication is required between RRM controllers 202 to coordinate slave-TRPs 202 with multiple slices.

TRPs assigned the role of RRM controllers 202, may need to communicate inside their cluster 201 and outside their cluster 201. Intra-cluster communication may be used to notify other RRM controllers 202 about potential resource conflicts, mobility management and topology changes (e.g. TRP switch on/off).

Figure 5:
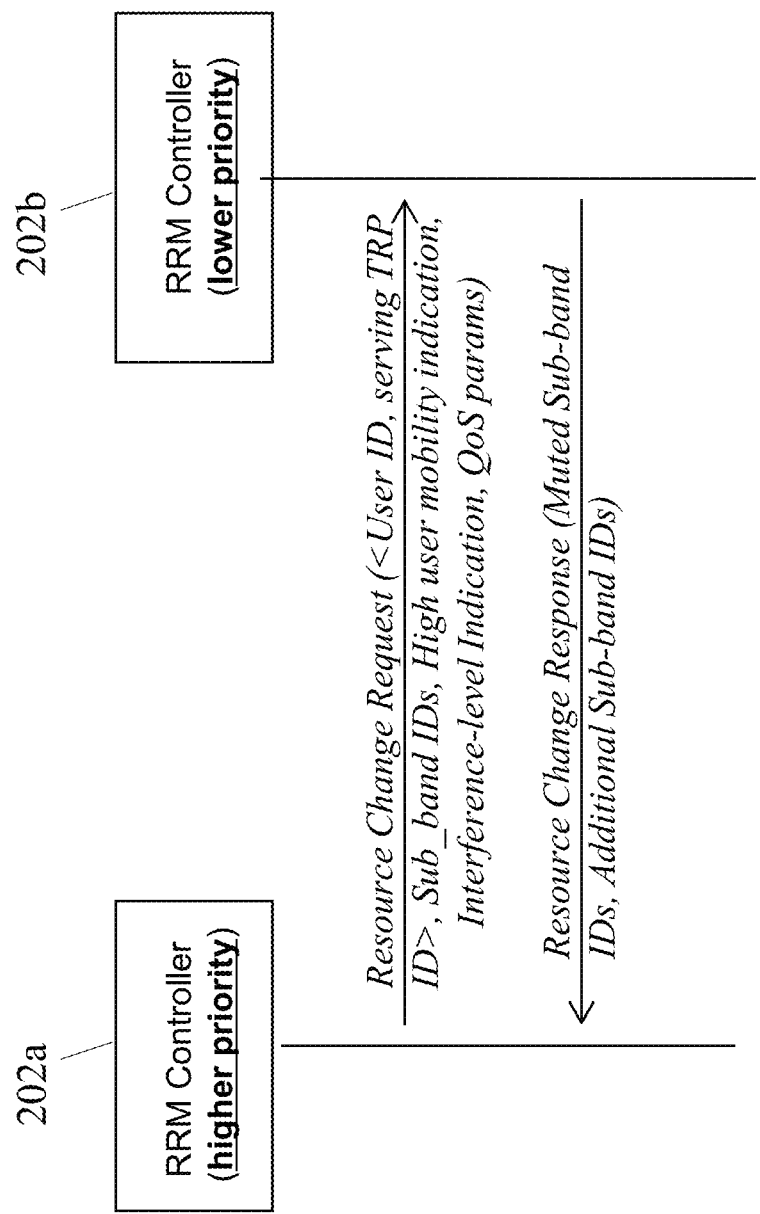
FIG. 5 shows an intra-cluster inter-controller communication process.

As can be seen in FIG. 5, for intra-cluster communication, which is the case for multiple RRM controllers 202 per cluster 201, a higher priority-RRM controller 202a may send to a lower priority RRM controller 202b a resource change request with parameters related to the users of the slave-TRPs 203 and the TRP resource situation/RAN characteristics, so as to proactively adapt resource management and avoid resource conflicts in overlapping resources.

The message defined is the Resource Change Request (higher priority RRM controller 202a to lower priority RRM controller 202b), and may consist of the following elements:
    <User ID, serving TRP ID>
    Sub_band IDs
    High user mobility indication
    QoS parameters
    Interference-level indication The User_ID identifies users, which suffer from high interference, so as to request additional resources from the spectrum, which is used by other network slices. Furthermore, high mobility indication and density indication are measurements stored at both RRM controllers 202a, 202b, in order to trigger an RRM split update as discussed further below. Upon the reception of this message the RRM controller 202b will select, whether to share additional resources with the response message (IDs of additional sub-bands) or to mute specific resources (muted sub-band IDs), which are shared between slices. Since the higher priority RRM controller 202a preferably enforces this to the lower priority RRM controller 202b, the latter will decide only on the resource sacrifice that it will do to satisfy the high priority RRM controller 202a. The new message to be exchanged is the Resource Change Response (lower priority RRM Controller 202b to higher priority RRM Controller 202a) and may consist of the following elements:
    Muted Sub-band IDs
    Additional Sub-band IDs For inter-cluster communication shown in FIG. 6, an RRM controller 2021 may first send a notification message for the situation at the edges of its cluster 201, since the RRM controller 2022 of the other cluster 201 may not be aware of the other TRPs of the adjacent clusters 201. Here it is to mention that due to the fact that un-planned small cells may exist, it may not be efficient that, when a TRP un-predictably activates, the RRM configuration device 100 informs all other clusters 201 about this activation.

Figure 6:
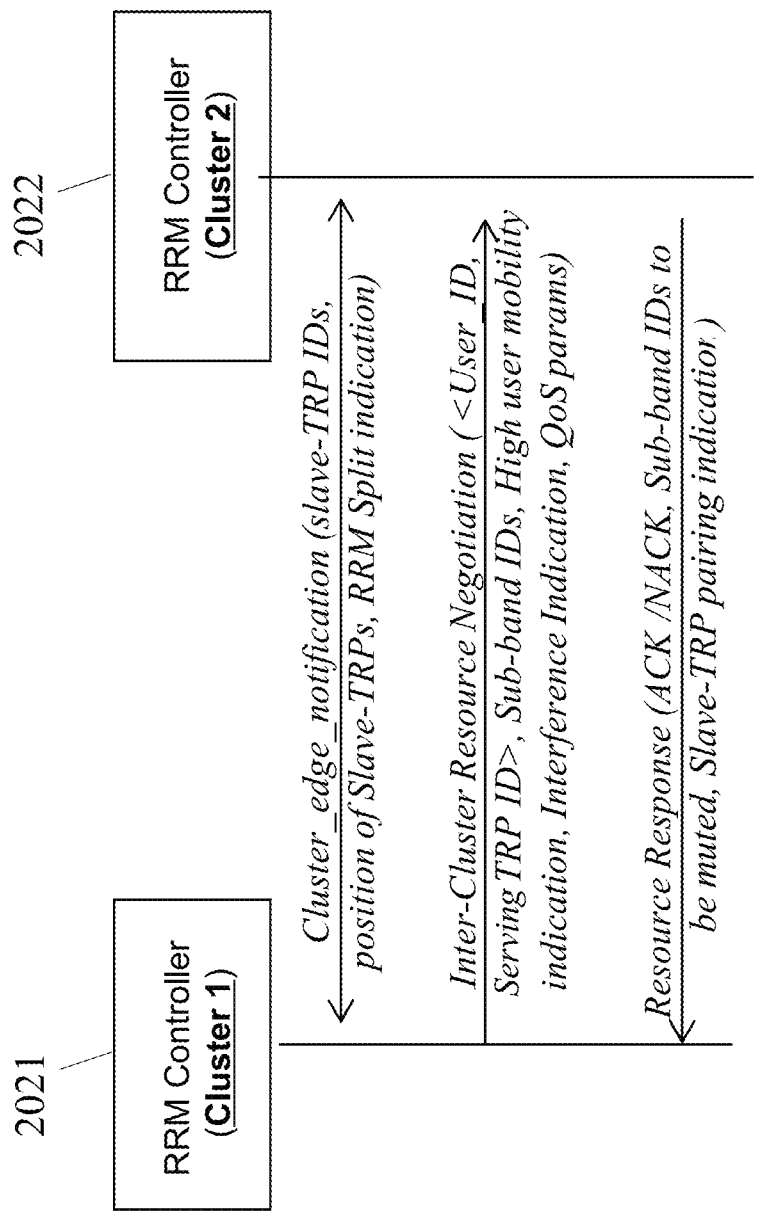
FIG. 6 shows an inter-cluster inter-controller communication process.

In particular, cluster_edge_notification (RRM controller 2021 to RRM controller 2022) message, as depicted in FIG. 6 may comprise:
    Slave-TRP ID
    Position for slave-TRP ID
    RRM split indication In addition, a similar message may be sent to the other RRM controller 2022 about Inter-Cluster Resource Negotiation (RRM Controller 2021 to RRM Controller 2022), and may consist of:
    <User ID, serving-TRP_ID>
    High User mobility indication
    QoS params
    Interference Indication
    Sub-band IDs The first element is used to identify the user (and its serving-TRP), which requires additional resources (due to high interference), or notifies the other cluster 201 for high interference in certain resources, in order to perform interference management based on this information. Upon the reception of this message the RRM controller 2022 may send a message with his re-action. This can be either the muting of some resources, or the sharing of resources with the other cluster, or to reject this request. The Resource Response (RRM controller 2022 to RRM controller 2021) message may consist of:
    ACK/NACK
    Sub-band IDs to be muted (can be void)
    Slave-TRP pairing indication The slave-TRP pairing info will allow the slave-TRPs 203 of different clusters 201 at the edges to jointly cooperate (e.g. Coordinated Multipoint Transmission), in order to enhance performance. Upon the reception of this notification, the slave TRPs 203 will exchange measurements for the backhaul and access conditions in a distributed manner, and will decide on a CoMP scheme that is followed.

The RRM split and the RRM controller 202 is preferably initially decided by the RRM configuration device 100 (e.g. NMS) in a per TRP and per slice manner. However, due to fast changing environments (e.g., switching on/off of nodes for energy efficiency, congestions on access or backhaul links etc.), and the fact that self-organized small cells may exist, which are locally deployed and coordinated (e.g. femtocells), the adaptation of the RRM split and possibly the RRM controller 202 may be required. RRM split adaptation is shown exemplarily in FIG. 7, and can be decided locally by the RRM controller 202, overriding the initial RRM configuration device 100 (here NMS) decision, since it may be more preferable to perform these changes locally, due to tight per slice timing constraints. For example, for a v2x case, adapting the Mobility Control from centralized to distributed may be required in a case of having vehicles in high mobility, and if due to an incident (or unexpected traffic jam) the cars become congested in low mobility. In this case, the RRM controller 202 should take the decision by also informing the other RRM controllers 202 to adapt the RRM split for the certain TRP and slice.

The trigger of an RRM split adaptation may be based on the following factors:

Firstly, the wireless backhaul conditions, which can change dynamically (e.g. for un-planned small cells) between TRP and RRM controller 202.

Secondly, the user densities may affect the decision. An example is the case when higher user density is expected in hotspot areas (than a pre-defined threshold), and Centralized Interference Management needs to be performed. It may be time consuming to perform this adaptation at the NMS 100.

Furthermore, the average user mobility information, which is acquired by each TRP may play an important role for the RRM split adaptation. In high mobility, more frequent handovers may be required. Hence, it may be needed to switch from distributed to centralized Mobility Control locally, in order to avoid large delays and possible handover failures.

Also, the slicing awareness is another factor that may affect the decisions for the RRM split and the RRM controller update. The characterization of TRPs will be based on the number slices and the load per slice the connected devices support. For each slice, the NMS 100—based on SLAs—may define thresholds for RAN characteristics, which can trigger a change on the centralization of certain functions. An example in this direction is the case when having an eMBB and URLLC slice sharing the same RAN. For URLLC, distributed RRM is more preferable (most RRM locally), so that the threshold to centralize RRM should be high (e.g. For Centralized Mobility Control). In eMBB, high Centralization is needed. If non-ideal backhaul exists, the RRM split is preferably chosen as centralized as possible, except if the mobility is very low and if there is no overlapping between small cells. Therefore, the threshold for average user mobility and density, which can trigger an adjustment on RRM configuration would be different for eMBB and for URLLC slices.

Another factor is the change of slice prioritization, given the criticality of the traffic for particular slice. An example is the case of mMTC traffic, where there is an alarm and it is needed to prioritize resource management for this slice over the others. This will trigger the negotiation of resources between slices, but also can trigger the RRM controller 202 and RRM split adaptation in case of massive state transition. This is preferably handled locally at the RRM controller 202 side, in order to avoid large delays for the communication with the NMS 100.

Figure 7:
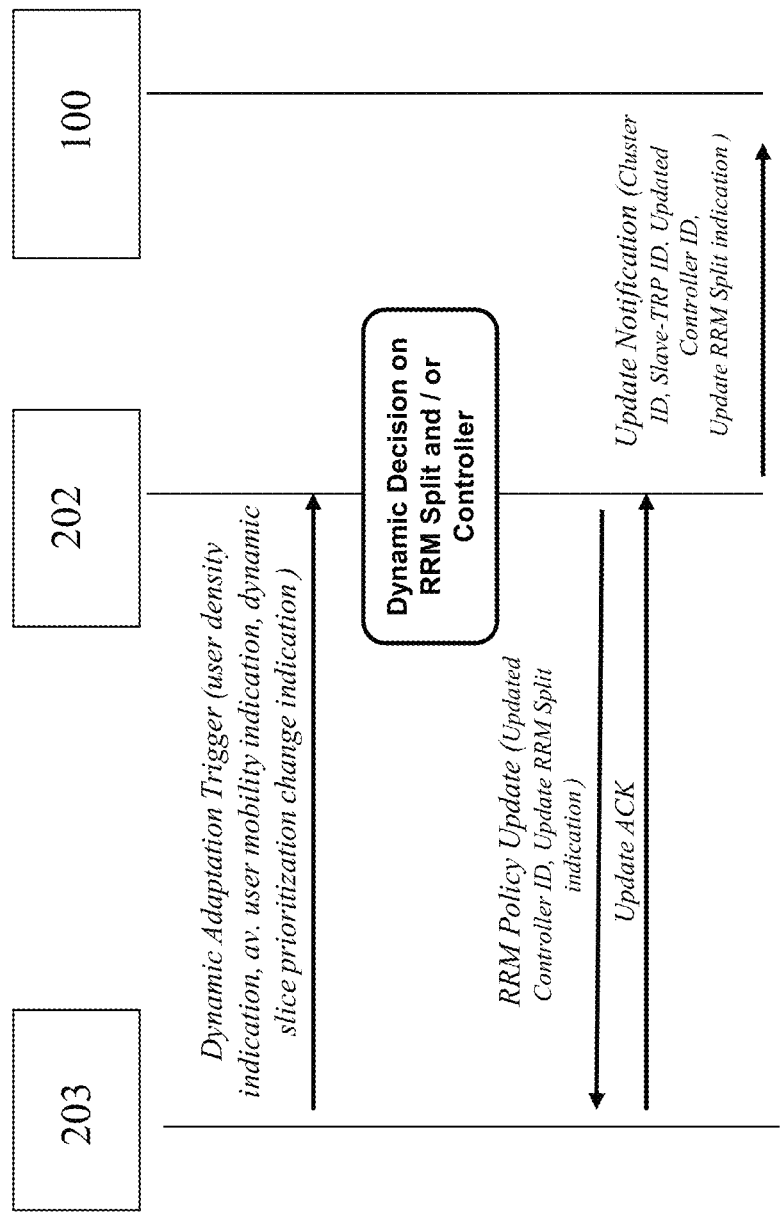
FIG. 7 shows a dynamic adaptation process of an initial RRM split.

FIG. 7 illustrates the message sequence chart and the new messages, which are needed for the dynamic adaptation in case of an event, e.g. dynamic change of density, mobility, or slice prioritization.

Each TRP-S (slave-TRP 203) may send the message Dynamic_Adaptation Trigger (slave-TRP 203 to RRM controller 202) with the following elements:
  User density indication
  Average user mobility indication
  Dynamic slice prioritization change indication The first two parameters indicate, whether user density and mobility is higher than a pre-defined threshold, and this may trigger an update of the RRM split, given the slice-aware RAN thresholds. Slice prioritization change is another parameter to notify the RRM controller 202 that a slice has higher priority to fulfill its target KPIs (e.g. due to interference, mobility). This may trigger a dynamic change of RRM split and possibly RRM controller 202 change.

Thereafter, the RRM controller 202 based on this trigger message and the slice SLA requirements and KPIs, may send to the slave-TRP 203 a message, namely RRM_policy_update (RRM Controller 202 to slave-TRP 203) with the indication:
  Updated controller ID
  Updated RRM split indication Following, upon reception of ACK from the slave-TRP 203, the RRM controller 202 may send to the network (here NMS 100) the updates regarding the RRM split and RRM controller 202 re-selection, with the message Update Notification (RRM Controller 202 to NMS 100):
  Cluster ID
  Slave-TRP ID
  Updated controller ID
  Update RRM split indication In FIG. 8 the process for the RRM controller 202 update is illustrated. Initially a new message with Update Notification may be sent to NMS 100. This may include the change of the old RRM controller 202o. The NMS 100 may then inform all RRM controllers 202 about this change, by sending new messages with the old and new RRM controller 202o, 202n, the RRM split and the slave-TRPs 203. Since the relation to the other RRM controllers 202 is not known by the new RRM controller 202n, the old RRM controller 202o sends locally to the new RRM controller 202n a message with the adjacent RRM controllers 202 and the priorities, to avoid getting all this information by the NMS 100.

Figure 8:
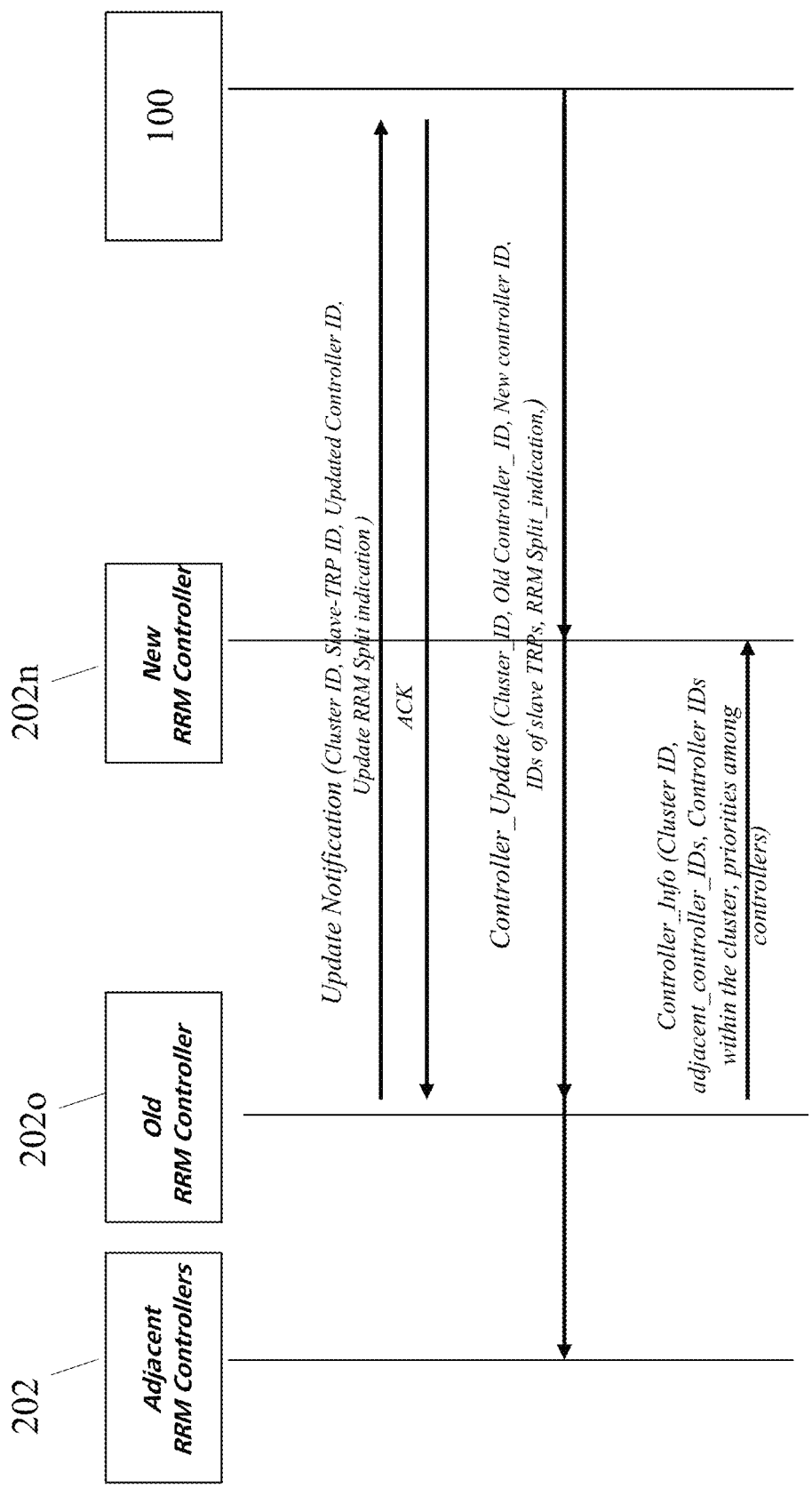
FIG. 8 shows a process for updating an RRM controller.

As can be seen in FIG. 8, in case of RRM controller re-selection, the NMS 100 will also update the other RRM controllers 202 about this decision with the message Update Notification (Old RRM Controller 202o to NMS 100), for example with the following parameters:
  Cluster ID
  Slave TRP ID
  Updated controller ID
  Updated RRM split indication Thereafter, the NMS 100 may send an acknowledgement and broadcasts to all RRM controllers 202 in the area the Controller Update (NMS 100 to RRM Controller 202) message with the following elements:
  Cluster ID
  Old Controller ID
  New Controller ID
  ID of Slave TRPs
  Updated RRM Split indications Finally, the old RRM controller 202o may send a message to the new RRM controller 202n, namely Controller Info (Old-to-New RRM Controller), to provide information about the other RRM controllers 202 in the area and the priorities among them. The elements of this message may be the following:
  Cluster ID
  Adjacent Controller IDs
  Controller IDs within the cluster 201
  Priorities among RRM controllers 202

Upon the reception of this message the RRM controllers 202 communicate each other as discussed previously.

Figure 9:
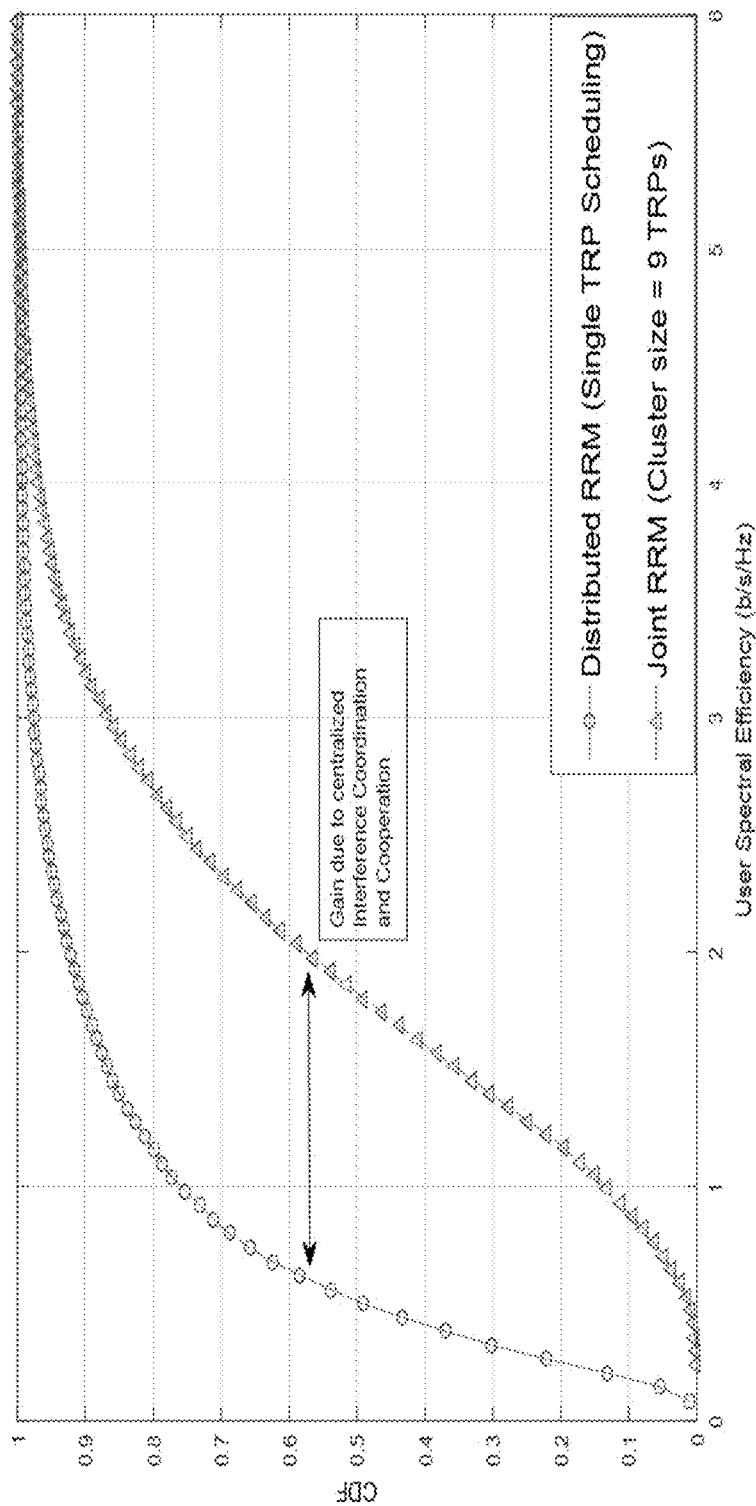
FIG. 9 shows a CDF of user spectral efficiency, and a comparison for centralized vs. distributed CoMP.

The benefits of the present invention are now summarized. In particular, the invention enables the use of centralized RRM solutions, even if there is no physical central node. Some indicative results are shown in FIG. 9, where Centralized Interference Management is performed for a cluster 201 of 9 TRPs using 3GPP LTE as a baseline for simulations (regular TRP deployment, 40 users uniformly distributed, 3GPP UMi channel, ideal BH). In case of Distributed RRM, the User Spectral Efficiency is lower for this particular simulation setup, as observed in FIG. 9.

Figure 10:
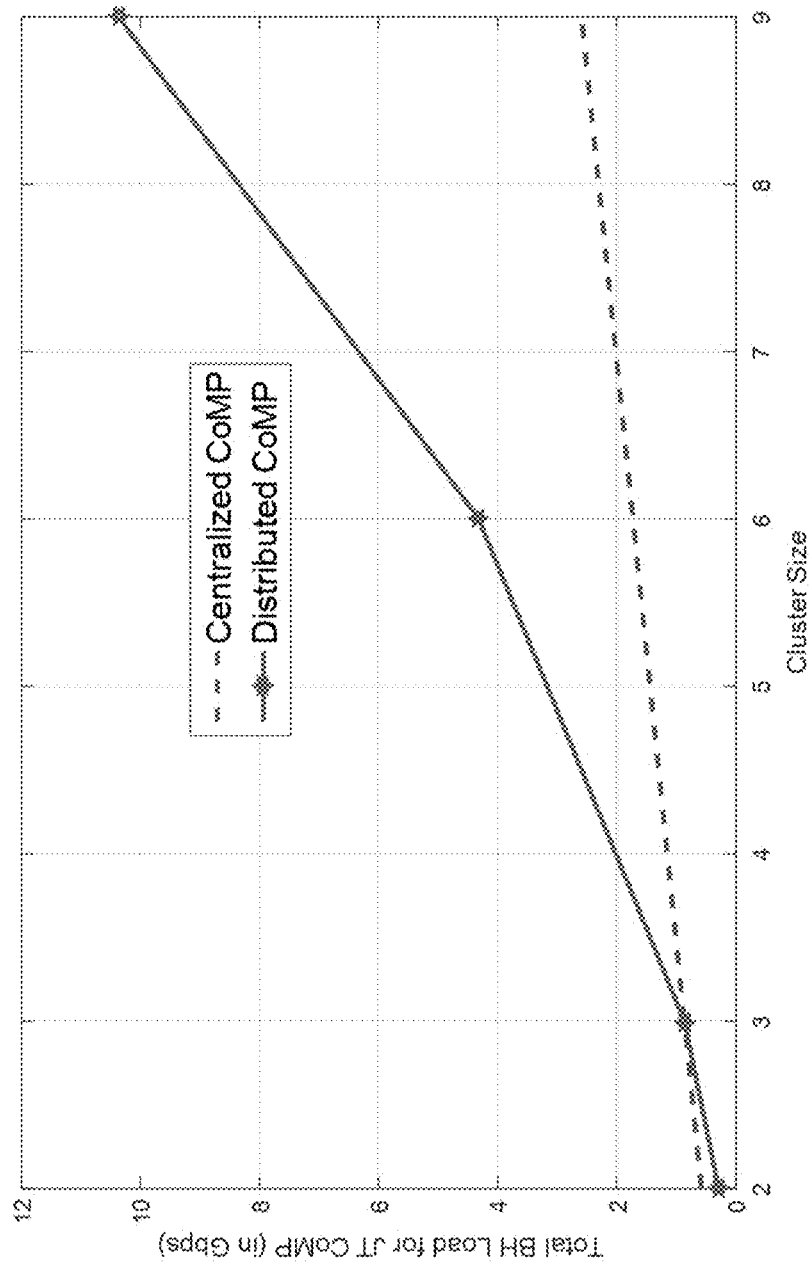
FIG. 10 shows a backhaul Load requirement, and a comparison for centralized vs. distributed CoMP.

On the other hand the signaling overhead and the data feedback that needs to be forwarded per backhaul ink (e.g. for JT CoMP) would be high for centralized solutions up to 3 TRPs in a cluster, but for large number of clusters centralized RRM need less backhaul for the data exchange overhead. As can be seen in FIG. 10, in centralized CoMP, the load increases linearly (2×number of TRPs), which can be much lower for large clusters than distributed.

In conclusion, a solution is provided for adaptively placing the RRM controller 202 in different TRPs taking into account the processing capabilities, the easy reach to the other TRPs, the load conditions and the slice requirements. The solution takes into account also the signaling needed for the configuration, where the target is to minimize the signaling for fast reaction time in case of changes.

This provides 1) Cost Efficiency, since a dedicated entity per cluster is not required, 2) Adaptation to a dynamically changing RAN environment, 3) C-Plane delays are expected to be lower, since the distribution of RRM functionalities in multiple RRM controllers 202 will allow some control information to be locally exchanged, 4) Slice-awareness in RAN with the minimum impact on RAN design.

The present invention provides also a solution for adaptively placing RRM functions in different TRPs taking into account the backhaul conditions, RAN characteristics and slice awareness. This will provide 1) Most sophisticated RRM when required (e.g. for eMBB) given the RAN backhaul/access resource situation, 2) Slice-awareness in RAN with the minimum impact on RAN design, 3) Local handling of RRM among slices, when different slices require additional resources in fast changing environments (e.g. for Critical Communications).

The present disclosure has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or operations and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

The invention claimed is:

1. A radio-resource management (RRM) configuration device, for a network comprising a plurality of access nodes, the RRM configuration device configured to:
   divide the plurality of access nodes of the network into clusters, such that each access node belongs in one cluster;
   select at least one access node of each cluster as an RRM controller and determine the non-selected access nodes of each cluster as slave nodes;
   select, for each cluster, an RRM split between each slave node and the at least one RRM controller of the respective cluster based on a backhaul quality of a slave node to the at least one RRM controller; and
   transmit, to each access node, information about the cluster in which the access node belongs, the at least one RRM controller of the cluster in which the access node belongs, and the selected RRM split.

2. The RRM configuration device according to claim 1, further configured to:
   select the RRM split based on a type of at least one network slice associated with the cluster.

3. The RRM configuration device according to claim 1, further configured to:
   select, for each cluster, the RRM split between a slave node and the at least one RRM controller of the respective cluster further based on an average load of the access nodes of the respective cluster.

4. The RRM configuration device according to claim 3, further configured to
   select the RRM split:
   as centralized RRM to be performed completely at the at least one RRM controller, if the backhaul quality is ideal and if the average load is below a threshold value; or
   as distributed RRM to be performed distributed among the access nodes of the cluster, if the backhaul quality is ideal and if the average load is above the threshold value; or
   as semi-centralized RRM, wherein a first type RRM is performed distributed among the access nodes of the cluster and a second type RRM is performed at the at least one RRM controller, if the backhaul quality is not ideal.

5. The RRM configuration device according to claim 1, further configured to:
   select the at least one access node of each cluster as RRM controller based on at least one of:
      processing capabilities of the access nodes of the cluster;
      an average load of the access nodes of the cluster;
         numbers of neighboring access nodes with ideal backhaul quality for each access node of the cluster; or
      Service Level Agreement (SLA) requirements or key performance indicators (KPIs) of at least one network slice associated with the cluster.

6. The RRM configuration device according to claim 1, further configured to:
   determine a priority among the selected RRM controllers based on types of network slices associates with the clusters,
   wherein the transmitted information includes the determined RRM controller priorities.

7. The RRM configuration device according to claim 1, further configured to:
   start dividing the plurality of access nodes of the network into the clusters, upon receiving a trigger event, preferably a slice instantiation request.

8. The RRM configuration device according to claim 1, which is configured to:
   select a cluster size based on at least one of:
      a number of network slices associated with the clusters;
      key performance indicators (KPIs) of the network slices;
      a number of users per network slice; or
      load conditions and backhaul conditions per network slice.

9. The RRM configuration device according to claim 1, wherein
the transmitted information includes at least a cluster ID, at least one RRM controller ID, and an indication about the RRM split.

10. A system comprising an RRM configuration device according to claim 1 and the plurality of access nodes, wherein an access node selected by the RRM configuration device as RRM controller of a cluster is configured to:
dynamically adapt the RRM split between a slave node and the at least one RRM controller in the cluster.

11. The system according to claim 10, wherein a slave node of a cluster is configured to:
send to the at least one RRM controller of the cluster an RRM split adaption request message, in order to initiate the dynamic adaption of the RRM split, when triggered by at least one of:
a change of backhaul conditions between the slave node and the at least one RRM controller;
a user density that is higher than a threshold value;
an average user mobility information that is higher than a threshold value; or
a change of a prioritization of network slices associated with the cluster.

12. The system according to claim 10, wherein an access node selected by the RRM configuration device as an RRM controller of a cluster is further configured to:
determine a slave node of the cluster to become a new RRM controller; and
transmit a notification about the new RRM controller to the RRM configuration device.

13. The system according to claim 10, wherein an access node selected by the RRM configuration device as an RRM controller of a cluster is further configured to:
transmit to another access node selected by the RRM configuration device as RRM controller a radio resource change request to re-negotiate the utilization of radio resources.

14. A radio resource management (RRM) configuration method comprising the operations of:
dividing a plurality of access nodes of a network into clusters, such that each access node belongs in one cluster;
selecting at least one access node of each cluster as an RRM controller, and determining the non-selected access nodes of each cluster as slave nodes;
selecting, for each cluster, an RRM split between each slave node and the at least one RRM controller of the respective cluster based on a backhaul quality of a slave node to the at least one RRM controller; and
transmitting, to each access node, information about the cluster in which the access node belongs, the at least one RRM controller of the cluster in which the access node belongs, and the selected RRM split.

15. The RRM configuration method according to claim 14, further comprising:
dynamically adapting the RRM split between a slave node and the at least one RRM controller of a cluster, and/or
determining a slave node of a cluster to become a new RRM controller.

16. A radio-resource management (RRM) configuration device, for a network comprising a plurality of access nodes, the RRM configuration device configured to:
divide the plurality of access nodes of the network into clusters, such that each access node belongs in one cluster;
select at least one access node of each cluster as an RRM controller and determine the non-selected access nodes of each cluster as slave nodes;
select, for each cluster, an RRM split between each slave node and the at least one RRM controller of the respective cluster based on a backhaul quality of a slave node to the at least one RRM controller;
transmit, to each access node, information about the cluster in which the access node belongs, the at least one RRM controller of the cluster in which the access node belongs, and the selected RRM split; and
select the RRM controllers by using a graph-based algorithm represented by a graph,
wherein the graph includes the plurality of access nodes, and wherein edges between the plurality of access nodes denote a suitability of coordination between these access nodes.

* * * * *